_United States Patent Office_

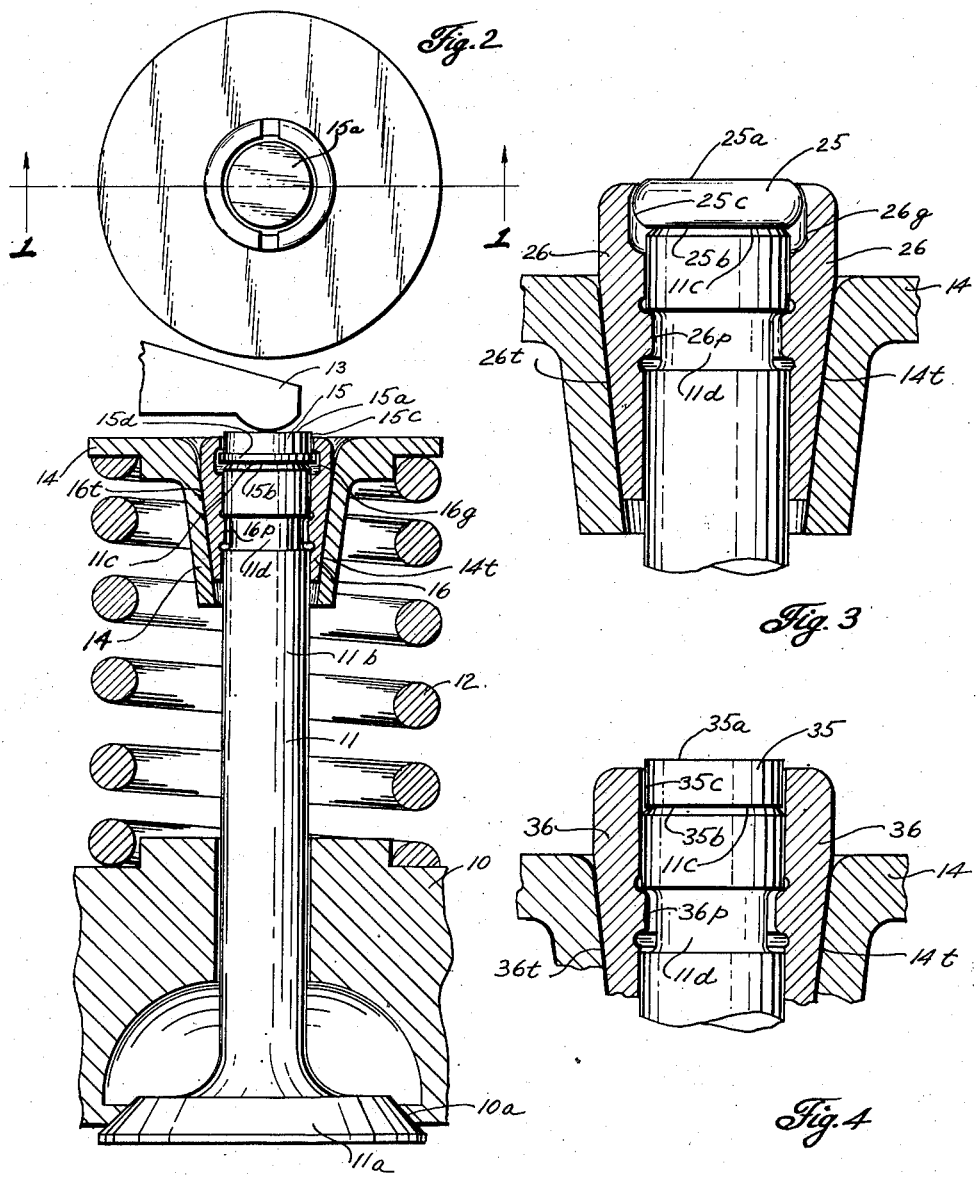

2,827,891
Patented Mar. 25, 1958

2,827,891

VALVE TIP CONSTRUCTION

Herbert H. Engemann, Cleveland Heights, Ohio

Application December 16, 1954, Serial No. 475,635

17 Claims. (Cl. 123—188)

This invention relates to improvements in a valve assembly construction and more particularly to a wear tip construction for a valve stem.

The valve stem tip on an internal combustion engine valve is subjected to considerable wear at its contact with the rocker arm, tappet or other valve actuating member during the operation of the engine. The relative movement, such as a sliding or rubbing movement, at this contact causes wear; this wear is especially noticeable when a pivoted oscillating rocker arm is being used to actuate a reciprocating valve. As wear occurs, clearances increase, noise increases as the relatively moving members snap into and out of the worn groove, and side thrust on the valve guide increases as new forces are created by the worn construction.

Several solutions to this wear problem have been considered but have not been found satisfactory. First, the valve stem tip is hardened or tempered by suitable heat treatment. However, some valve stems are not hardenable. Second, a hard material is welded or brazed to the valve stem tip. This process not only is expensive but also often complicates heat treatment of the valve stem. Valves having either of these first two mentioned constructions may soon become worn or scuffed to the extent that repair becomes advisable; this repair is expensive since the valves must be removed from the engine and the valves themselves must be reconditioned. Third, a cup-shaped removable and hardened cap may be telescopically mounted over the valve stem tip. While this construction may be less expensive than the first two mentioned constructions, it has the disadvantage of requiring extra valve stem length to provide sufficient side engagement to retain the cap on the valve stem during engine operation. The present invention not only eliminates all of the above-mentioned disadvantages and many others but also includes features not found in these constructions.

One of the objects of the present invention is to provide a low-cost and easily replaceable wear surface for the end of a valve stem.

Another object of the present invention is to provide a wear surface on a wear member of simple shape, such as a disk, so that hard materials, such as tungsten carbide, stellite, etc., can be used, which materials would be difficult and expensive to shape into a suitable cup-shape cap or to weld or braze to the end of a valve stem.

Another object of the present invention is to provide a reversible wear member for a valve stem with said member having reversible wear surfaces thereon to double the wear life.

Another object is to provide a retaining means for a wear member without adding additional parts to but by only slightly modifying conventional valve assembly construction.

Another object of the present invention is to provide a wear member having a wear surface which can be made of extremely hard material.

Another object of the present invention is to provide a retaining means for a wear member on a valve stem (1) to permit free rotation or float of the wear member relative to the valve stem to equalize wear and increase wear life, (2) to prevent or to permit axial removal of the wear member from the valve stem without otherwise disassembling the unit, and/or (3) to clamp the wear member against the valve stem to prevent rotation with respect thereto and removal therefrom.

Another object of the present invention is to provide a wear member with a hard wear surface substantially harder than the valve stem to which it is adapted to be attached so that the hard surface will resist wear while the valve stem will be tough enough to have long life.

Another object of the present invention is to provide in a single compact unit a combined valve stem wear cap and valve spring retainer construction providing both functions, being inexpensive to manufacture by altering conventional valve assembly construction, providing maximum spring length for a given valve length, and providing minimum valve stem protrusion above the valve spring retainer.

Other features in this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a longitudinal sectional view taken along the line 1—1 of Fig. 2 of an internal combustion engine poppet valve assembly construction having the present invention incorporated therein;

Fig. 2 is a plan view of assembly shown in Fig. 1 with rocker arm removed; while Figs. 3 and 4 are enlarged, fragmentary views of the upper half of Fig. 1 but illustrating a second and third form of wear assembly construction.

Before the valve assembly construction herein illustrated is specifically described, it is to be understood that the invention here involved is not limited to the structural details or arrangement of parts here shown since constructions embodying the present invention may take various forms. It also is to be understood that the phraseology or terminology herein employed is for purposes of description and not of limitation since the scope of the present invention is denoted by the appended claims.

Those familiar with this art will recognize that my invention may take various forms and may be applied in many ways, but I have chosen to illustrate the same in connection with a replaceable wear surface construction for an internal combustion engine valve stem tip of known type.

The conventional internal combustion engine construction forms a part of the Fig. 1 illustration. The conventional internal combustion engine housing 10 has a valve port 10a, either of the exhaust or inlet type, adapted to be opened and closed by endwise movement of valve head 11a on poppet valve 11. The valve is opened by having a generally axial force exerted downwardly on the top of the valve stem by valve actuating member or rocker arm 13; valve 11 is returned to its closed position illustrated in Fig. 1 by the force of valve spring 12 upon removal of this valve opening force.

Any suitable spring retainer means may be used for abutting against one end of the valve spring and operatively connecting it to the valve stem. In the present construction, this means includes an annular spring retainer member 14 telescopically mounted over valve stem 11b remote from valve head 11a with this member 14 being operatively connected to the valve stem, in a manner to be described in more detail hereinafter, by means for preventing substantial relative movement away from the valve head. This spring retainer means may if desired take the form of a valve rotator construction, operable in response to changes in the force of spring 12 and having relatively axially movable members.

Three different forms of wear assembly construction are illustrated. These include wear members 15, 25 and 35 in Figs. 1, 3 and 4 respectively. Each wear member is of generally disk shape having generally parallel opposite surfaces, designated by the reference numeral suffixes "a" and "b," adapted to be located between and to coact respectively with valve actuating member 13 and valve stem tip or squared end 11c. Each disk is approximately the same diameter as the valve stem and is detachably mounted in generally coaxially or concentrically aligned relationship with the valve stem 11b. Wear member 15 has an annular and cylindrical surface 15c with an outwardly extending integral, annular flange 15d at the end adjacent the valve stem; wear member 25 has an annular peripheral surface 25c forming a convex curve in longitudinal section; and wear member 35 has an annular or cylindrical peripheral surface 35c throughout its whole length.

Each of these wear members is detachably assembled in proper relationship with valve stem tip 11c by a wear member retainer means. Each retainer means is formed from surrounding annular surfaces taking the form of a sleeve, at least one segment of, or a group of segments of an annular element, here shown as being two in number in Fig. 2 but suitably composed of any desired number. The keys or retainer segments in each of the three groups are of slightly different construction and are here designated as retainer segments or keys 16, 26 and 36 in Figs. 1, 3 and 4 respectively. However, any suitably shaped split key construction, collet with separate and independent retainer segments or interconnected (such as integral) retainer segments, or other keying means and any suitable coacting valve stem shape may be used. In Figs. 1, 3 and 4, each of these segments is independent of its associated wear member and the opposite parallel surfaces thereon. Each group of segments and its associated wear member forms an embracing and coacting construction for detachable assembly. The term "embracing" is intended to include not only the preferred construction herein shown with the bore of the segments surrounding the periphery of their associated wear member, but also the alternative construction with the encirclement of the parts reversed by having a wear member of cap form having a depending annular skirt forming a bore surrounding coacting surfaces on the periphery of its associated group of segments.

A common assembling means is provided for retaining both the wear member and spring retainer means in assembled position on valve stem 11b. Each of the three illustrated forms of invention is basically the same in this regard. Each has coacting tapers 14t in the bore of the annular spring retainer member 14 and tapers 16t, 26t or 36t on the periphery of its associated segments. The bore formed by each group of segments has at least one inwardly directed, shoulder or projection 16p, 26p or 36p on each segment thereof coacting with a peripheral groove 11d on the valve stem to form an interlockable construction. But it should be realized that the projections and grooves can be reversed on the parts and still obtain the same function. In each illustrated form of the invention, the valve spring biases these coacting tapers together and urges the associated group of segments firmly against the associated valve stem so that the shoulder projections are forced into and coact with their associated groove to prevent relative movement of the assembly axially along the associated valve stem by the valve spring. The coacting tapers and spring in each form of the invention urge the associated group of segments radially inwardly into wear member retaining relationship by embracing both the associated valve stem and wear member.

The illustrated forms of the invention have many advantages.

First, the contacting fit between or the diametrical dimensions of the embracing surfaces on each wear member and its associated retainer segments may be altered to give different characteristics to the construction even though the general form of the component parts remains as illustrated and each group of segments always firmly engages its associated valve stem periphery.

The dimensions of the embracing surfaces may be chosen so that diametrical dimensional clearance exists between these surfaces to permit rotational freedom of the associated wear member for rotation or float about an axis generally coaxial with the longitudinal axis of the valve stem. In each of the three forms of the invention, the wear member peripheral surfaces and its surrounding retainer segment bore surfaces are annular in shape to form concentric, circumferentially disposed surfaces with a sliding fit therebetween to permit relative rotation of the wear member. Hence, the wear member can rotate or float under the influence of the forces exerted thereon by coaction between valve 11 and its actuating member 13 so that this freedom of movement will equalize the wear and increase the life of the wear member.

This wear member retainer construction permitting free rotation may either lock against or permit axial removal of the wear member from the assembly. Lock means is provided in Figs. 1 and 3 to prevent axial removal of the associated wear members from the assemblies. This lock means is provided by having groove or recess 16g or 26g in Figs. 1 and 3 respectively formed in the wear member embracing bore of the retainer segment group 16 or 26 for rotatably housing flange 15d in Fig. 1 or convex peripheral curved surface 25c in Fig. 3 with the radially inwardly projecting shoulder forming the upper end of each groove or recess preventing axial removal of its wear member from the respective assembly. In Fig. 4, wear member 35 may be axially removed from the assembly, turned upside down and reversed in position, or originally installed without first loosening segments 36 or disassembling them from assembled position in Fig. 4. However, this axial removal is normally prevented by the contact pressure of the valve actuating member 13 normally pressing wear member 35 down against the valve stem tip 11c during engine operation.

In each form of the invention, the wear member may be clamped to the valve stem to prevent not only axial removal therefrom but also relative rotation with respect thereto by providing a diametrical dimensional interference or friction fit between these embracing surfaces in assembled position. The group of segments then act as a clamping collet to firmly clamp the wear member to the valve stem tip. Of course, any suitable complementary shape on the embracing surfaces of the retainer segments and associated wear member may be used for clamping since concentricity or generally annular shape is no longer required to permit rotation.

Any of these aforementioned fits and locks are possible with these constructions since spring 12 and coacting tapers 14t and 16t, 26t or 36t firmly press the bore of their respective retainer segments against the associated cylindrical valve stem periphery to maintain accurately the diametrical dimensions between the distal or upper ends of the retainer segments embracing the associated wear member.

These illustrated forms of the invention also have other characteristics independent of the diametrical clearance between the embracing surfaces.

Second, the wear member may be made of a different hardness than the valve stem so that each will have maximum wear life. The hardness of the wear member will resist the wear caused by the relative sliding action of the valve operating member 13 while the toughness of the valve stem will resist premature failure caused by stress concentration at valve stem peripheral groove 11d. If no separate wear member were used and the valve stem tip were hardened sufficiently to resist wear, it would prematurely fail at the peripheral groove under the endless repetition of stresses to which a poppet valve is subjected.

Third, wear members 25 and 35 in Figs. 3 and 4 respectively are reversible in their retainer means to give a double length wear life. Since each is symmetrical about a transverse central plane, it can be reversed to present either of its two, opposite, parallel wear surfaces (25a, 25b or 35a, 35b) to contacting relationship with the valve actuating member 13. Since both wear members 25 and 35 are also bisymmetrical in form and have an annular peripheral shape, they not only are reversible in their retainer means but are also adapted to rotate relative thereto.

Fourth, a maximum spring length in Fig. 1 is obtained for a given valve length in each form of the invention since the assembled parts are all located in approximately coplanar relationship in a transverse plane at the valve stem tip remote from the valve head and since the valve spring retainer means and the wear member retainer means have many common, coacting parts providing functions for both means. This coplanar relationship is clearly shown in Fig. 1; slight modification of the coasting tapers in Figs. 3 and 4 will form basically the same construction. This ratio of spring and valve length is desirable since it keeps the overall valve length and overall engine dimensions down to a minimum for proper fit into an automobile, for example.

Fifth, the top surface of each segment is located below the top wear surface (15a, 25a or 35a) of its associated wear member so that valve actuator 13 may coact with this wear surface to actuate the valve and be free to slide across this wear surface without interference with the retainer segments.

Sixth, the construction is inexpensive to manufacture and inexpensive to service or repair. The combined valve stem wear tip and valve spring retainer construction provides in a single unit a dual function. Also, only a slight modification of the segments on a valve spring retainer is required to form the wear member retainer construction. Each of the illustrated wear members is an easily manufactured, simple shape of a generally disk form; each may be wholly formed of or have a surface formed thereon of any suitable hard material, such as tungsten carbide, stellite, etc. Also, when repair is required, only the wear member (the only wearable part) need be replaced. The construction permits easy assembly and disassembly of the wear member on the valve stem tip without welding, brazing or other heating operations. The repair man need only depress the annular valve spring retainer member 14 a slight amount against the bias of the valve spring 12 to release the retainer segments sufficiently from the coacting taper bore 14t to permit removal of the worn wear member and installation of a new one.

Various changes in details and arrangement of parts can be made by one skilled in the art without departing from either the spirit of this invention or the scope of the appended claims.

What I claim is:

1. In a combined valve stem wear tip and valve spring retainer structure, a spring retainer means for abutting against one end of a valve spring, a wear member, wear member retainer means forming with said wear member an embracing connection therebetween for detachably assembling said wear member to the tip of said valve stem remote from the valve head, and assembling means cooperating with the bias of said valve spring for retaining said wear member retainer means and said spring retainer means in assembled position with said valve and against axial relative substantial movement in at least one direction with respect to said valve, said wear member being symmetrical about a transverse central plane so that said member may be reversed to present either of two opposite wear surfaces.

2. In a combined valve stem wear tip and valve spring retainer, a spring retainer means for abutting against one end of a valve spring, a wear member, wear member retainer means for detachably assembling said wear member to the tip of said valve stem remote from the valve head, and assembling means cooperating with the bias of said valve spring for retaining said wear member retainer means and said spring retainer means in assembled position with said valve and against axial relative substantial movement in at least one direction with respect to said valve, said assembling means including on said valve stem and at least one of said retainer means a coacting projection and groove interlockable construction for preventing relative axial movement of both said retainer means relative to said valve stem, said wear member being substantially harder than said valve stem to resist wear thereon while the softness of said valve stem resists breakage at said interlockable construction.

3. In a combined valve stem wear tip and valve spring retainer, a spring retainer means for abutting against one end of a valve spring, a wear member, wear member retainer means for detachably assembling said wear member to the tip of said valve stem remote from the valve head, and means cooperating with the bias of said valve spring for retaining said wear member retainer means and said spring retainer means in assembled position with said valve stem and against axial relative substantial movement in at least one direction with respect of said valve stem, said wear member retainer means and said wear member having thereon concentric circumferentially disposed coacting surfaces forming a bore in one embracing a periphery on the other with the diametrical clearance therebetween to permit relative rotation thereof.

4. In the construction in claim 3, wherein the peripheral surface is on said wear member and has a generally cylindrical surface throughout its whole length for permitting axial removal of said wear member from said bore and for permitting relative rotation of said wear member within said bore but with said axial removal normally prevented by having the actuating member for said valve normally pressing the wear member against the valve stem.

5. In the construction in claim 3, lock means to prevent axial removal of said wear member from said valve stem.

6. In the construction in claim 5, wherein said wear member retainer means includes segments of an annular element, and wherein said lock means includes radially projecting shoulders on said segments, each shoulder having its surface located most remote from the valve head being located below the wear surface of said wear member most remote from the valve so that the valve actuator may coact therewith without interference.

7. In the construction in claim 3, lock means to prevent axial removal of said wear member from said valve stem, said wear member being bisymmetrical in form whereby said wear member may be reversed to present either of two wear surfaces.

8. In the construction in claim 3, wherein the peripheral surface is on said wear member and has a generally convex surve in longitudinal section, said bore having a recess therein to rotatably house said convex curve and to prevent axial removal of said wear member from said valve stem.

9. In the construction in claim 3, wherein the peripheral surface is on said wear member and has a generally cylindrical surface with an outwardly extending flange near one end, said bore having a recess therein to rotatably house said flange and to prevent axial removal of said wear member from said valve stem.

10. In a combined valve stem wear tip and valve spring retainer, a spring retainer means for abutting against one end of a valve spring, a wear member, wear member retainer means comprising segments of an annular element forming with said wear member an embracing connection having a frictional fit therebetween of the collet type for detachably clamping said wear member to the tip of said valve stem remote from the valve head against axial and rotational movement relative thereto, and means cooperating with the bias of said valve spring for retaining said wear member retainer means and said spring retainer means in assembled position with said valve stem and against axial relative substantial movement in at least one direction with respect to said valve stem.

11. In the construction in claim 10, wherein the surface of said wear member at said embracing connection has a generally cylindrical surface throughout its whole length.

12. In the construction in claim 10, wherein the surface of said wear member at said embracing connection has a generally convex curve in longitudinal section.

13. In the construction in claim 10, wherein the surface of said wear member at said embracing connection has a generally cylindrical surface with an outwardly extending flange.

14. In a combined valve stem wear tip and valve spring retainer structure, a spring retainer means for abutting against one end of a valve spring, a wear member, wear member retainer means forming with said wear member an embracing connection therebetween for detachably assembling said wear member to the tip of said valve stem remote from the valve head, and assembling means cooperating with the bias of said valve spring for retaining said wear member retainer means and said spring retainer means in assembled position with said valve and against axial relative substantial movement in at least one direction with respect to said valve, said wear member being confined axially wholly on the side of said valve stem tip remote from said valve head, whereby the lateral dimension of said structure is minimized.

15. In a combined valve stem wear tip and valve spring retainer structure, a spring retainer means for abutting against one end of a valve spring, a wear member, wear member retainer means forming with said wear member an embracing connection therebetween for detachably assembling said wear member to the tip of said valve stem remote from the valve head, and assembling means cooperating with the bias of said valve spring for retaining said wear member retainer means and said spring retainer means in assembled position with said valve and against axial relative substantial movement in at least one direction with respect to said valve, said wear member being a flat disc arranged transversely to the valve stem axis.

16. In a combined valve stem wear tip and valve spring retainer structure, a spring retainer means for abutting against one end of a valve spring, a wear member, wear member retainer means forming with said wear member an embracing connection therebetween for detachably assembling said wear member to the tip of said valve stem remote from the valve head, and assembling means cooperating with the bias of said valve spring for retaining said wear member retainer means and said spring retainer means in assembled position with said valve and against axial relative substantial movement in at least one direction with respect to said valve, said wear member and said retainer means having coacting surface means permitting axial removal of said wear member without disturbing said retainer means.

17. In a combined valve stem wear tip and valve spring retainer structure, a spring retainer means for abutting against one end of a valve spring, a wear member, wear member retainer means forming with said wear member an embracing connection therebetween for detachably assembling said wear member to the tip of said valve stem remote from the valve head, and means cooperating with the bias of said valve spring for retaining said wear member retainer means and said spring retainer means in assembled position with said valve stem and against axial relative substantial movement in at least one direction with respect of said valve stem, said wear member retainer means and said wear member having thereon concentric circumferentially disposed coacting surfaces forming a bore in one embracing a periphery on the other with the wear member having a generally cylindrical surface throughout its whole length for permitting axial removal of said wear member from said retainer means but with said axial removal normally prevented by having the actuating member for said valve normally pressing the wear member into assembled position.

References Cited in the file of this patent

UNITED STATES PATENTS

| 941,314 | Evans | Nov. 23, 1909 |
| 999,941 | Yale | Aug. 8, 1911 |
| 1,462,160 | Anthony | July 17, 1923 |
| 1,896,072 | Crawford | Feb. 7, 1933 |

FOREIGN PATENTS

| 428,998 | Great Britain | May 22, 1935 |
| 918,309 | France | Feb. 5, 1947 |
| 130,994 | Australia | Jan. 17, 1949 |